June 27, 1967   F. A. WILMANNS ET AL   3,327,412
OUTSOLES HAVING CALKS AND METHOD OF MANUFACTURING THE SAME
Filed Feb. 25, 1965   2 Sheets-Sheet 1
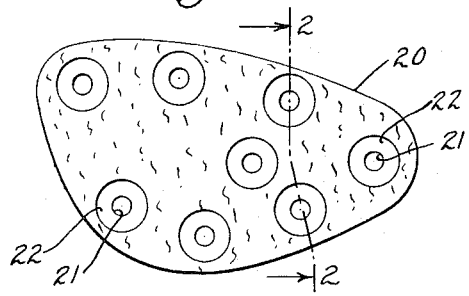
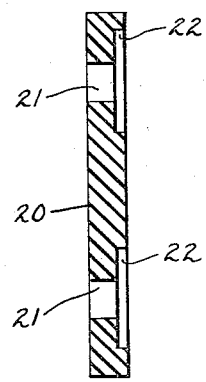
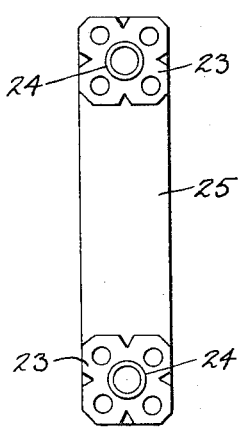
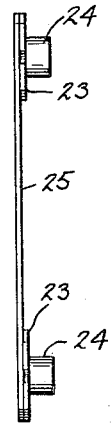
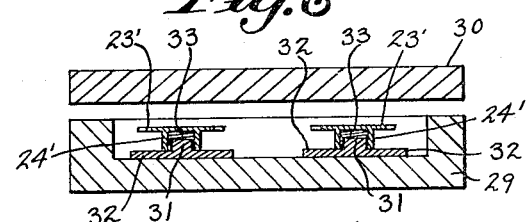
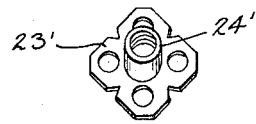
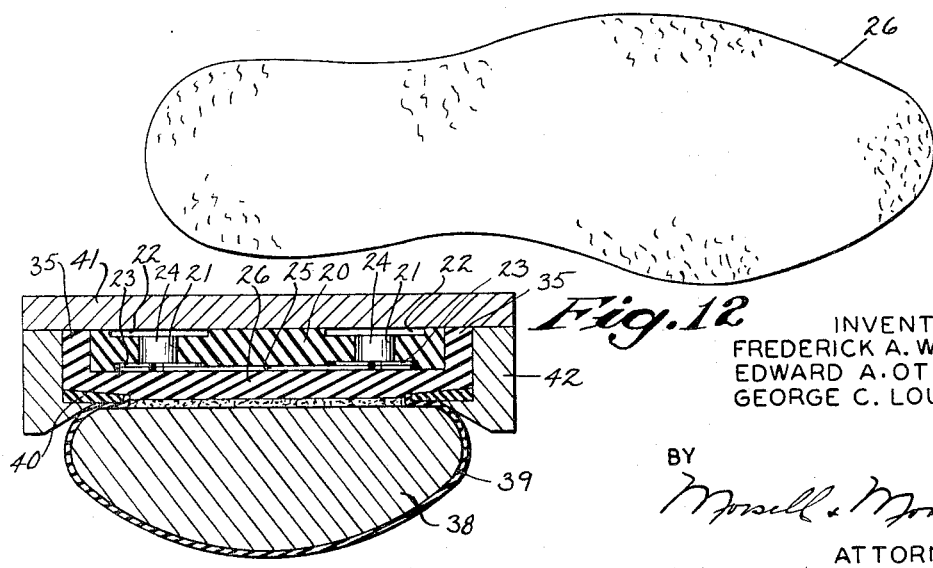
INVENTORS
FREDERICK A. WILMANNS
EDWARD A. OTT
GEORGE C. LOUCKS
BY
Morsell & Morsell
ATTORNEYS

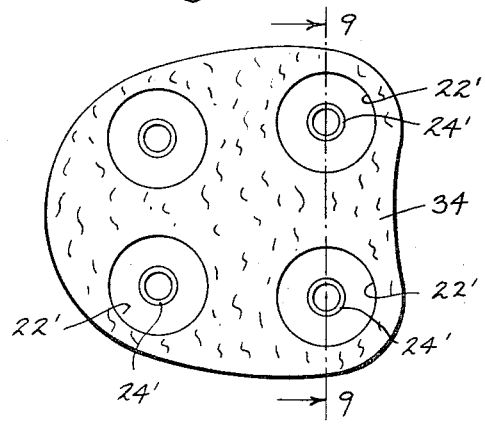
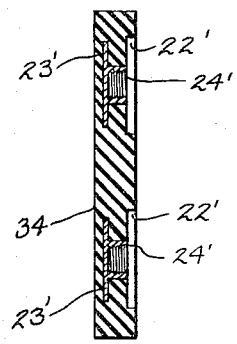
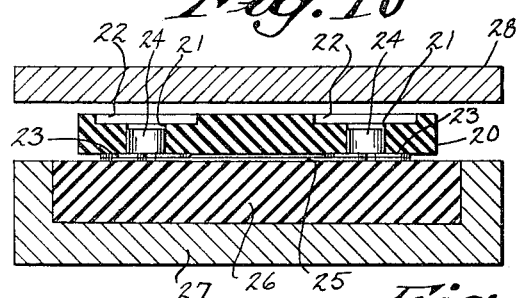
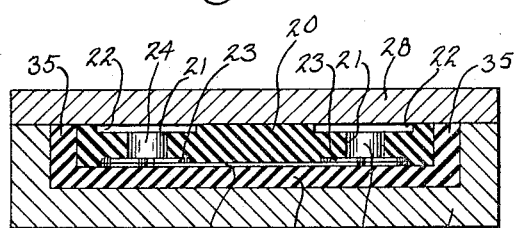
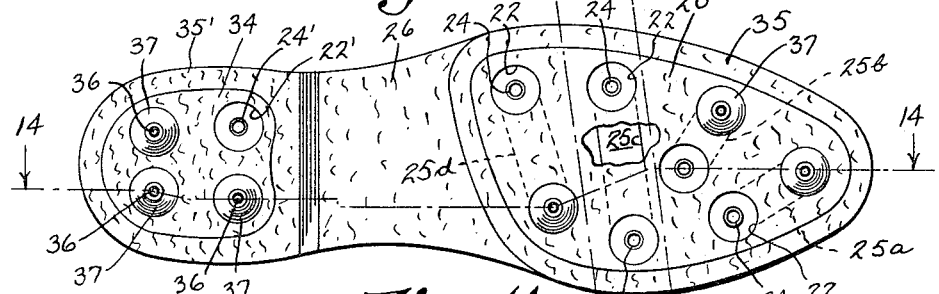
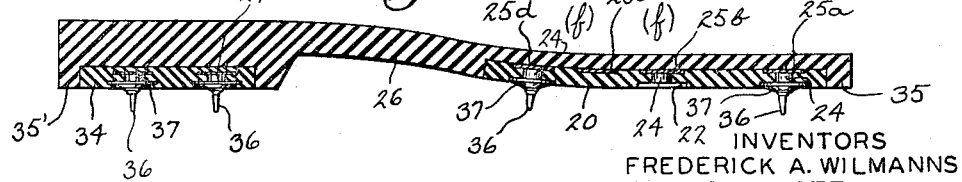

United States Patent Office 3,327,412
Patented June 27, 1967

3,327,412
OUTSOLES HAVING CALKS AND METHOD OF MANUFACTURING THE SAME
Frederick A. Wilmanns, Milwaukee, Edward A. Ott, Merrill, and George C. Loucks, Milwaukee, Wis., assignors, by mesne assignments, to The Weinbrenner Shoe Corporation, Milwaukee, Wis., a corporation of Wisconsin
Filed Feb. 25, 1965, Ser. No. 435,312
6 Claims. (Cl. 36—59)

This invention relates to improvements in outsoles having calks and method of manufacturing the same.

Calks for sport shoes, such as golf shoes, usually each include an anchored base which supports a threaded socket. Each socket must be so carried by the outsole that its outer end communicates with the tread portion of the outsole so that calks may be threaded therein. Heretofore, it has been customary to have these socket bases on the upper side of the outsole with the sockets projecting entirely through the outsole. This arrangement is reasonably satisfactory for leather-soled shoes. However, leather soles are not waterproof and, in addition, the Goodyear welt construction makes it impossible to have the calks as close to the edge of the shoe as might be desired. Rubber or composition soles are generally thicker than leather outsoles with the resulting difficulty of having sockets which extend all the way through such thickness. Furthermore, there are problems in connection with the anchoring of calks in conventional rubber outsoles. Calked rubber-soled golf shoes are a desirable construction in that the calks can be used closer to the edge where there is no Goodyear welt construction, but if calk sockets extend all the way through a conventional rubber outsole this allows moisture to undesirably penetrate through the outsole.

It is a general object of the present invention to provide an improved outsole having calks wherein there is a main outsole and one or more inserts of less thickness than the main outsole and which form the tread surface, the calk sockets extending through the insert only and the latter being vulcanized to the main outsole during the process of manufacturing the composite outsole.

A further object of the invention is to provide an improved calked outsole wherein the anchoring bases of the calks are kept a farther distance away from the foot, with the resulting additional comfort.

A further object of the invention is to provide an improved calked outsole wherein holes for receiving the calk sockets are pre-formed during the molding of the inserts and are also pre-formed with countersunk recesses for accommodating the collars of the calks to thereby minimize the collection of mud and grass between said collars and the sole.

A further object of the invention is to provide an improved method of manufacturing calked outsoles.

With the above and other objects in view, the invention consists of the improved calked outsole and method of manufacturing the same, and all of its parts and combinations, as set forth in the claims, and all equivalents thereof.

In the accompanying drawings, illustrating several embodiments of the invention, in which the same reference numerals designate the same parts in all of the views:

FIG. 1 is a plan view of a molded sole insert with pre-formed holes and recesses;

FIG. 2 is a sectional view taken on line 2—2 of FIG. 1 after the insert has been molded to final form;

FIG. 3 is a plan view of one of the anchoring strips with two sockets thereon;

FIG. 4 is an edge view of the construction of FIG. 3;

FIG. 5 is a plan view showing an outsole blank before the insert is incorporated therein;

FIG. 6 is a transverse sectional view through a mold for forming a heel insert, showing calk sockets supported in the mold;

FIG. 7 is a perspective view of one of the socket members which is to be molded into the heel insert;

FIG. 8 is a plan view of one of the completed heel inserts with socket members molded therein;

FIG. 9 is a sectional view taken on the line 9—9 of FIG. 8;

FIG. 10 is a transverse sectional view showing a partially-cured outsole in a molding press with an insert, having strip-carried socket members attached thereto, laid in position on top of the outsole;

FIG. 11 is a view similar to FIG. 10 after the mold has been closed, showing how the insert is embedded into the outsole while vulcanization of the latter is completed;

FIG. 12 is a view showing a modified method wherein the insole is embedded in and bonded to the outsole simultaneously with the vulcanization of the outsole in position on the last in the manufacture of a shoe to bond the outsole to the upper and welt;

FIG. 13 is a plan view looking at the bottom of a completed outsole and showing the calks threaded into the sockets, part of the sole insert being broken away; and FIG. 14 is a sectional view taken on the line 14—14 of FIG. 13.

Referring more particularly to the drawings, the inserts 20 are cut to the approximate size and shape shown in FIG. 1 from sheets of vulcanizable rubber, synthetic rubber, or combinations of rubber and synthetic materials, or from any like material capable of being rendered soft by heat and of being molded and converted by vulcanization to a condition suitable for use as a sole. When the term "rubber" is used in the claims it contemplates any of such material. These inserts are formed from a suitable mix, including a vulcanization agent and other well known ingredients, and preferably including chemicals for the purpose of giving increased shelf life to the cured item. The inserts 20, cut to the approximate size and outline of FIG. 1, are placed in a molding press and molded to the cross-sectional form shown in FIG. 2. In this molding, there will be suitable inserts in the mold to pre-form socket holes 21 in the insert and to pre-form collar recesses 22. If complete vulcanization of the insert is desired, the molding is done at approximately 300° F. with a pressure of approximately 1200 lbs. per square inch in approximately 2½ minutes.

For use in connection with the sole inserts 20 the bases 23 of calk sockets 24 are welded or otherwise connected to thin strips 25 preferably of metal. Each strip may carry a plurality of socket members. In the preferred embodiment of the invention, each strip carries two socket members, one at each end, as is illustrated in FIGS. 3 and 4, and there will be an assortment of strips of varying length.

The main part of the outsole is also formed of a suitable vulcanizable rubber compound or synthetic rubber mix capable of being vulcanized to form an outsole which preferably has somewhat different properties from the material of the insert. The outsole is cut from sheets of uncured rubber or rubberlike material to the approximate size and shape desired, as shown at 26 in FIG. 5, and is put in a mold, which may include the shape of the heel if there is to be an integral heel as in the completed outsole shown in FIGS. 13 and 14. The mold is closed and the outsole rubber is partially cured for a short length of time, such as two or three seconds. The mold, which may include a lower die member 27 and an upper movable plate 28 (FIGS. 10 and 11), is then opened for placement of the inserts thereon.

Where it is desired to have a calked heel as well as a calked sole, which is usually the case in shoes for sport purposes, heel inserts must also be prepared. FIG. 6 illustrates a mold having a lower die member 29 and an upper plate 30 for use in forming the heel inserts. The lower die member 29 supports special fittings 31 of metal or the like. These include discs 32 shaped to form the collar recesses in the heel inserts. The fittings 31 also include upstanding studs 33 for loosely supporting individual heel calk sockets 24' as shown in FIG. 6. These calk sockets 24' are illustrated in FIG. 7 and include bases 23'. While heel inserts may be formed in the same manner as the sole inserts, it is preferred not to employ the strips 25 of FIG. 4 when making the heel inserts.

After the mold has been prepared as in FIG. 6, a blank of vulcanizable rubber like that used for the insert of FIG. 1 is cut to approximate size for the heel insert. These are placed on top of the socket bases 23' of FIG. 6 and the mold is closed. The molding is done at approximately 300° F. with a pressure of approximately 1200 lbs. per square inch for approximately 2½ minutes, the rubber material flowing around the calk sockets and their bases so that the latter are embedded in the completed heel inserts in the manner shown in FIGS. 8 and 9 where the heel insert is designated by the numeral 34. It will be noted that, in the preferred embodiment illustarted, the base 25' of the calk sockets for the heel are embedded inwardly of the bottom surface of the heel inserts. It will also be noted that the discs 32 in the mold of FIG. 6 form the calk collar recesses 22' in the heel inserts.

To form the completed outsole of the type shown in FIGS. 13 and 14 a heel insert 34 and a sole insert 20 are placed on top of the partially-vulcanized main outsole 26, as in FIG. 10, the socket-carrying strips of FIGS. 3 and 4, in assorted lengths, having been previously engaged with the sole insert 20 so that there is one socket in each of the holes 21 of the sole insert. These metal strips 25 are furnished in a variety of lengths and are arranged in a special manner as will be hereinafter described (see FIG. 13).

The mold of FIG. 10 is then closed, as shown in FIG. 11, and the parts are vulcanized together under suitable pressure for approximately seven minutes at 300° F. During such procedure the sole inserts 20 and heel inserts 34 are pressed into the outsole proper, as in FIG. 11, so that the upper portions of the inserts are substantially flush with the surfaces of the surrounding margins 35 of the outsole proper and 35' of the heel proper. The inserts have been previously fully cured so that this is accomplished without damage to the pre-formed collar recesses 22 and 22'.

After completion of the vulcanization, the improved outsole is removed and may be fitted with calks 36 having collars 37 by threading the shanks of the calks into the threaded sockets 24 and 24', as shown in FIGS. 13 and 14. Due to the fact that the inserts have been preformed with the collar recesses 22 and 22', the collars 37 of the calks will be depressed in final position, and there will be less possibility of mud and grass getting between the calk collars and the inserts. It is to be noted that in the final product of FIG. 14 the insert 20 is firmly united by vulcanization with the main outsole, with the socket bases 23 and strips 25 vulcanized between the inserts and the main outsole portions.

In the outsole construction for a golf shoe, as illustrated in FIGS. 13 and 14, there are four metal strips like those shown in FIGS. 3 and 4 employed, each carrying a pair of calk sockets. The front strip 25a of FIG. 13 is short, the next strip rearwardly (25b) is also short, and then there are two transversely-arranged longer strips 25c and 25d which are so arranged transversely of the outsole as not to interfere with flexing along the two lines f—f beneath the ball of the foot.

The present process also makes it possible to manufacture calked outsoles directly on the last in accordance with the general process of Rollman Patent No. 2,789,295 dated Apr. 23, 1957. Referring to FIG. 12, it will be seen that there is a last 38 over which the shoe upper 39 is stretched, there being a welt 40 stitched to the edges of the upper. During such process the procedure of FIG. 11 may be accomplished directly on the last with the use of a molding press having a movable plate 41 and having a surrounding mold portion 42. The main outsole is first partially cured in a position adjacent the welt and the lower edges of the upper. Next, the mold is opened and the inserts 20 and 34 laid on the partially cured main outsole just as in FIG. 10. Thereafter, the mold is again closed and embedding of the inserts in the outsole in the relationship shown in FIG. 13 is accomplished during vulcanization while all of the parts are assembled on the last. Where inserts are incorporated in both the sole and heel, the bottom of the outsole of the final article will have the appearance shown in FIG. 13. In all cases where the term "outsole" is used in the claims, it contemplates either an outsole having a sole insert such as one of the inserts 20 with no heel insert, or an outsole having an integral heel with both sole and heel portions having inserts as in FIG. 13.

In the final article it is to be noted that the inserts are completely surrounded by the margins 35 and 35' of the outsole proper.

It is apparent from FIG. 14 that all of the anchoring bases for the calks are anchored in a downwardly spaced position from the upper surfaces of the outsole proper and thus are farther away from the foot to give greater comfort in use. It is also apparent that the method of anchoring the bases of the calk sockets through the use of inserts eliminates any possibility of the sockets coming out of the shoe as frequently happens with other constructions. Furthermore, all of the calk sockets terminate short of the upper surface of the outsole so there is no dange of moisture penetrating through the outsole. As before mentioned, the recesses 22 and 22' for the calk collars 37 allow the calk collars to seat below the tread surface of the inserts to thereby minimize the possibility of grass and mud getting between the calk collar and the outsole.

Various changes and modifications may be made without departing from the spirit of the invention, and all of such changes are contemplated as may come within the scope of the claims.

What we claim is:

1. An outsole for golf shoes comprising a main outsole of rubber and a rubber insert of a width to extend beneath a major portion of the width of a wearer's foot and of less thickness than said main outsole embedded in and bonded to the main outsole and surrounded by a marginal tread surface portion of the main outsole, and calk sockets having enlarged end flanged base portions locked between the insert and main outsole intermediate the thickness of the latter, and having socket portions projecting from said base portions through said insert and communicating with the tread surface of the insert to receive calks.

2. An outsole for golf shoes comprising a main outsole of rubber and a rubber insert of a width to extend beneath a major portion of the width of a wearer's foot and having a plurality of calk socket holes, said insert being embedded in and bonded to said main outsole and surrounded by a marginal tread surface portion of the main outsole, and calk sockets having end flanges of greater size than said socket holes locked between the insert and the main outsole intermediate the thickness of the latter and having socket portions projecting from said flanges through said holes of the insert for the reception of calks from the exterior.

3. An outsole for golf shoes as claimed in claim 2 wherein the outer side of the insert has a preformed recess surrounding each calk hole for accommodating the collar portion of a calk which is engaged in the socket.

4. An outsole for golf shoes comprising a main outsole of rubber, and a rubber insert of a width to extend beneath a major portion of the width of a wearer's foot and of less thickness than the main outsole having a multiplicity of calk socket holes therethrough arranged in spaced pairs, a plurality of metal base strips each carrying a pair of calk sockets with the pair of sockets on each strip so spaced as to match the spacing between a pair of holes in the insert, said strips being positioned between the insert and main outsole intermediate the thickness of the latter and having their sockets projecting into their respective socket holes of the insert, the insert being embedded in and bonded to said main outsole and surrounded by a marginal tread surface portion of the main outsole.

5. In a method of manufacturing an outsole for a golf shoe, the steps of molding a blank of uncured rubber to form an insert having a width to extend beneath a major portion of the width of a wearer's foot having spaced calk socket holes therethrough, partially curing another blank of rubber in a mold to form a main outsole of greater width and thickness than the insert, inserting calk sockets having bases in the holes with the bases on one side of the insert, positioning an insert on the partially cured main outsole with the side having the socket bases against the main outsole, and pressing the insert into embedded condition in the main outsole until the socket bases are intermediate the thickness of the outsole while completing the curing and molding of the main outsole to vulcanize the latter to the insert.

6. In a method of manufacturing an outsole for a golf shoe, the steps of molding a blank of uncured rubber to form an insert having a width to extend beneath a major portion of the width of a wearer's foot having spaced calk socket holes therethrough, partially curing another blank of rubber in a mold to form a main outsole of greater width and thickness than the insert, mounting a plurality of calk sockets in spaced position on each of several flat strips with the spacing between sockets matching the spacing between certain socket holes in the insert, inserting the sockets in their respective holes of the insert with all of the strips on the same side of the insert, positioning an insert on the partially cured main outsole with socket strips between the insert and main outsole, and pressing the insert into embedded condition in the main outsole until the socket bases are intermediate the thickness of the outsole while completing the curing and molding of the main outsole to vulcanize the latter to the insert.

References Cited

UNITED STATES PATENTS

| | | | |
|---|---|---|---|
| 59,357 | 11/1866 | Case | 36—30 |
| 1,278,320 | 9/1918 | Ellithorpe | 36—59 |
| 1,366,797 | 1/1921 | Harris | 36—59 |
| 1,507,844 | 9/1924 | Mason | 36—32 |
| 2,290,792 | 7/1942 | Abbott | 36—59 |
| 2,758,396 | 8/1956 | Edwardes | 36—59 |

FOREIGN PATENTS

| | | |
|---|---|---|
| 16,394 | 1891 | Great Britain. |
| 774,742 | 5/1957 | Great Britain. |
| 509,794 | 1/1955 | Italy. |

PATRICK D. LAWSON, *Primary Examiner.*

JORDAN FRANKLIN, *Examiner.*

A. R. GUEST, *Assistant Examiner.*